United States Patent
Hattori et al.

(10) Patent No.: US 10,353,925 B2
(45) Date of Patent: Jul. 16, 2019

(54) DOCUMENT CLASSIFICATION DEVICE, DOCUMENT CLASSIFICATION METHOD, AND COMPUTER READABLE MEDIUM

(71) Applicant: FUJI XEROX CO., LTD., Tokyo (JP)

(72) Inventors: Keigo Hattori, Kanagawa (JP); Hiroshi Masuichi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 608 days.

(21) Appl. No.: 14/717,034

(22) Filed: May 20, 2015

(65) Prior Publication Data

US 2015/0254332 A1    Sep. 10, 2015

Related U.S. Application Data

(63) Continuation of application No. PCT/JP2013/068852, filed on Jul. 10, 2013.

(30) Foreign Application Priority Data

Dec. 21, 2012 (JP) ................. 2012-279624

(51) Int. Cl.
  *G06F 17/30* (2006.01)
  *G06F 16/28* (2019.01)
  *G06F 16/93* (2019.01)
  *G06F 16/35* (2019.01)

(52) U.S. Cl.
  CPC .......... *G06F 16/285* (2019.01); *G06F 16/355* (2019.01); *G06F 16/93* (2019.01)

(58) Field of Classification Search
  CPC ......... G06F 17/30554; G06F 17/30598; G06F 16/285

See application file for complete search history.

(56) References Cited

U.S. PATENT DOCUMENTS

| 7,099,819 B2 | 8/2006 | Sakai et al. |
| 2002/0016798 A1 | 2/2002 | Sakai et al. |
| 2002/0078044 A1* | 6/2002 | Song ............... G06F 17/3071 |

(Continued)

FOREIGN PATENT DOCUMENTS

| CN | 101561805 A | 10/2009 |
| JP | 10-078971 A | 3/1998 |
| JP | 11-167581 A | 6/1999 |

(Continued)

OTHER PUBLICATIONS

Communication dated May 31, 2016 from the Japanese Patent Office in counterpart application No. 2012-279624.

(Continued)

*Primary Examiner* — Amanda L Willis

(74) *Attorney, Agent, or Firm* — Sughrue Mion, PLLC

(57) ABSTRACT

A document classification device includes a characteristic extraction unit, a clustering unit, and a category update unit. The characteristic extraction unit extracts characteristic information from each of plural document data which are classified in advance into specific categories. The clustering unit classifies the document data with similar appearance frequency of the characteristic information into a same cluster. The category update unit assigns the document data which is classified into the same cluster with a category of different document data which is classified into the same cluster as a category of the document data.

17 Claims, 10 Drawing Sheets

(56) References Cited

U.S. PATENT DOCUMENTS

2007/0011020 A1* 1/2007 Martin .............. G06F 17/30864
                                                          705/1.1
2009/0077028 A1* 3/2009 Gosby .............. G06F 17/30707

FOREIGN PATENT DOCUMENTS

| | | |
|---|---|---|
| JP | 2002-041544 A | 2/2002 |
| JP | 2005-182611 A | 7/2005 |
| JP | 2008-269375 A | 11/2008 |
| JP | 2009-070321 A | 4/2009 |
| JP | 2009-259250 A | 11/2009 |

OTHER PUBLICATIONS

International Search Report for PCT/JP2013/068852 dated Aug. 20, 2013.

* cited by examiner

FIG. 4

| ID | CATEGORY | LEARNING DATA |
|---|---|---|
| 1 | SUMMARY | ............ |
| 2 | SUMMARY | ............ |
| 3 | HISTORY | ............ |
| 4 | CONFIGURATION | ............ |
| ⋮ | ⋮ | ⋮ |

FIG. 5

| WID | 17 | 21 | 37 | 61 | 65 | 101 | 102 | ... |
|---|---|---|---|---|---|---|---|---|
| TERM | FIA | YEAR 1997 | ANNOUNCE | WORLD RALLY CAR | PRODUCTION MODEL | CONTENT | FORD | ... |
| NUMBER OF TIMES OF APPEARANCE | 3 | 2 | 1 | 3 | 1 | 1 | 3 | ... |

FIG. 6

| CID | ID OF CLASSIFIED LEARNING DATA |
|---|---|
| 1 | 1, 3, 10, ... |
| 2 | 2 |
| 3 | 4, 5, 11, ... |
| ... | |

FIG. 7

| CID [NUMBER OF ELEMENTS] | CLASSIFIED CATEGORY [NUMBER OF TIMES OF APPEARANCE, APPEARANCE RATIO] |
|---|---|
| 1[516] | HISTORY[120, 0.23], SUMMARY[101, 0.20], ... |
| 2[1] | SUMMARY[1, 1.00] |
| 3[333] | CONFIGURATION[91, 0.27], SUMMARY[52, 0.16], ... |
| ... | |

FIG. 8

| ID | CATEGORY | CLUSTER CATEGORY | LEARNING DATA |
|---|---|---|---|
| 1 | SUMMARY | 1<br>HISTORY[0.23],<br>SUMMARY[0.20],<br>... | ⋯⋯ |
| 2 | SUMMARY | 2<br>SUMMARY[1.00] | ⋯⋯ |
| 3 | HISTORY | 1<br>HISTORY[0.23],<br>SUMMARY[0.20],<br>... | ⋯⋯ |
| 4 | CONFIGURATION | 3<br>CONFIGURATION[0.27],<br>SUMMARY[0.16],<br>... | ⋯⋯ |
| ⋮ | ⋮ | | ⋮ |

DOCUMENT CLASSIFICATION DEVICE, DOCUMENT CLASSIFICATION METHOD, AND COMPUTER READABLE MEDIUM

CROSS-REFERENCE TO RELATED APPLICATIONS

This application is based on and claims priority under 35 USC 119 from PCT International Application No. PCT/JP2013/068852 filed Jul. 10, 2013.

BACKGROUND (i) Technical Field

The present invention relates to a document classification device, a document classification method, and a computer readable medium.

(ii) Related Art

Techniques for classifying document data into specific categories have been known.

When boundaries between categories are ambiguous, document data may not be able to be clearly classified into specific categories. For example, categories of document data may be "History" as well as "Summary". Categories of document data may be "Configuration" as well as "Summary". Furthermore, when a person intends to classify document data, the way in which classification is performed varies depending on the person. Therefore, categories assigned to document data may be different from person to person. As described above, it is difficult to guarantee independence of categories. Furthermore, fluctuations in category classification depending on people occur. Therefore, for learning data that is classified into a specific category in advance, a combination of the learning data and the category may not be accurate. Although it may be considered that categories are finely defined so that fluctuations in category classification do not occur, a finer category definition may require a higher category setting cost, and fluctuations in category classification may occur depending on the person who assigns categories. Furthermore, in the case where categories are determined automatically, for example, when the term "Summary" does not appear in a specific data set, even if the data set represents "Summary", it is impossible to classify the data set into a "Summary" category. Moreover, when categories are determined automatically, a person may not be able to understand the meaning of the categories which have been classified.

SUMMARY

According to an aspect of the invention, there is provided a document classification device including a characteristic extraction unit, a clustering unit, and a category update unit. The characteristic extraction unit extracts characteristic information from each of plural document data which are classified in advance into specific categories. The clustering unit classifies the document data with similar appearance frequency of the characteristic information into a same cluster. The category update unit assigns the document data which is classified into the same cluster with a category of different document data which is classified into the same cluster as a category of the document data.

BRIEF DESCRIPTION OF THE DRAWINGS

Exemplary embodiments of the present invention will be described in detail based on the following figures, wherein:

FIG. 4 is a table illustrating an example of learning data classified into specific categories in advance;

FIG. 5 is a table illustrating an example of vector representation of learning data;

FIG. 6 is a table illustrating clustering results;

FIG. 7 is a table illustrating analysis results of clusters;

FIG. 8 is a table illustrating an example of learning data to which cluster categories are assigned;

DETAILED DESCRIPTION

Figure 1:
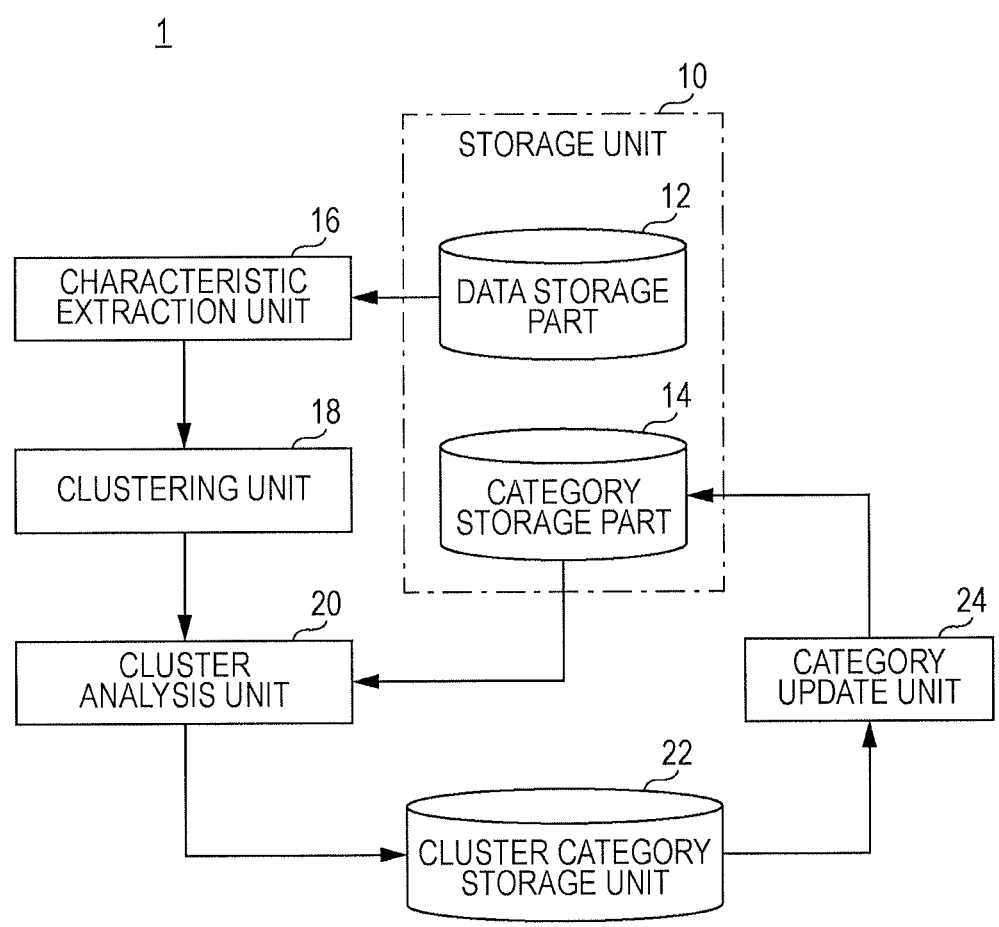
FIG. 1 is a block diagram illustrating an example of a document classification device according to an exemplary embodiment of the present invention.

FIG. 1 illustrates an example of a document classification device according to an exemplary embodiment of the present invention. A document classification device 1 includes a storage unit 10, a characteristic extraction unit 16, a clustering unit 18, a cluster analysis unit 20, a cluster category storage unit 22, and a category update unit 24. The document classification device 1 assigns a new category, in consideration of an ambiguity in definition of a category, to learning data which is classified into a specific category in advance.

The storage unit 10 includes a data storage part 12 and a category storage part 14. The data storage part 12 stores learning data which is classified in advance into specific categories. The learning data is, for example, document data including one or multiple sentences. The learning data may be any type of data, regardless of the type of a category or the quality of the learning data, as long as it is classified into a specific category in advance. For example, the learning data may be data which is collected automatically utilizing the structure of a document, by treating the title of a chapter or a paragraph of the document as a category and treating the document within the chapter or the paragraph as learning data. Learning data is assigned with learning data identification information (for example, an ID number or the like) for identifying the learning data. Furthermore, learning data is associated with category information which indicates a category of the learning data. The category storage part 14 stores category information associated with the learning data.

The characteristic extraction unit 16 extracts characteristic information from each of plural learning data, and vectorizes the learning data using the extracted characteristic information. The characteristic extraction unit 16 extracts, as characteristic information, one or more items of morphological information, part-of-speech information, syntactic/semantic information, character/term N-gram, an arbitrary term, the number of punctuations, the number of terms in past tense, and the like. The above information serves as features of a vector. A score of each feature may be a binary value (0 or 1), the number of times of appearance, a term frequency-inverse document frequency (Tf-idf) value, or the like. Furthermore, the characteristic extraction unit 16 may treat synonyms as an identical feature by utilizing a dictionary or the like, or compress the dimension of a vector by providing a threshold for the Tf-idf value and removing a feature that may serve as a noise. By removing the feature which may serve as a noise, the accuracy of document classification is improved. For example, a term with an idf value which is less than or equal to a lower limit threshold may be determined as a general term, and therefore may not be used as a feature of a vector. Furthermore, a term with an idf value which is equal to or more than an upper limit threshold has a possibility that an identifier is dependent largely on a feature, and therefore may not be used as a feature. In this manner, the characteristic extraction unit 16 may select characteristic information used for cluster classification by the clustering unit 18, in accordance with the score of a feature.

The clustering unit 18 classifies learning data which have similar characteristic information into the same cluster, based on the characteristic information extracted by the characteristic extraction unit 16. Specifically, the clustering unit 18 classifies vector-represented learning data into clusters by using a method, such as a repeated bisection method, a K-means method, or a latent Dirichlet allocation (LDA) method. For example, the clustering unit 18 classifies learning data which have similar appearance frequency of characteristic information into the same cluster. The clustering unit 18 assigns each cluster with cluster identification information (for example, an ID number or the like) for identifying the cluster.

The cluster analysis unit 20 analyzes configurations of categories within a cluster, based on category information associated with learning data which belongs to the cluster, and outputs an analysis result to the cluster category storage unit 22. Specifically, the cluster analysis unit 20 obtains, based on category information associated with learning data which belongs to a cluster, the number of times of appearance of category of each learning data which belongs to the same cluster within the cluster and the appearance ratio within the cluster. The appearance ratio of each category represents the number of times of appearance of the category to the number of times of appearance of all the categories belonging to the same cluster. Furthermore, when the number of data which constitute a cluster is smaller than the number of data of all of or other clusters and the difference between the numbers is equal to or larger than a predetermined threshold, the cluster may serve as a noise. Therefore, the cluster analysis unit 20 may remove learning data which belongs to the cluster. Moreover, among the categories which belong to the same cluster, a category whose number is less than the number of a different category and for which the difference between the numbers is equal to or larger than a predetermined threshold may serve as a noise. Therefore, the cluster analysis unit 20 may remove such a category. By removing a cluster or learning data which may serve as a noise, the accuracy of document classification is improved. For example, a category with an appearance ratio which is less than or equal to a predetermined threshold may be removed from a cluster. Furthermore, the cluster analysis unit 20 may limit the number of categories to be included in a cluster. For example, the cluster analysis unit 20 may include a predetermined number of categories into a cluster in decreasing order of the appearance ratio, and may not include the other categories into the cluster. In this manner, the cluster analysis unit 20 may select categories to be used for cluster categories, in accordance with the appearance ratio of the categories.

The cluster category storage unit 22 stores cluster category information as an analysis result of the cluster analysis unit 20.

The category update unit 24 newly defines each category which belongs to the same cluster and the appearance ratio of the category as a cluster category, and by utilizing cluster category information which indicates the cluster category, updates a category of each learning data. That is, the category update unit 24 assigns learning data which belongs to the same cluster with a category of a different learning data which belongs to the cluster as a category of the learning data. For example, the category update unit 24 assigns cluster identification information of a cluster to each learning data which belongs to the cluster, and associates the learning data with cluster category information of the cluster. In this manner, each learning data is classified into a corresponding cluster category. Here, each cluster category is assigned with cluster identification information. The category storage part 14 stores cluster category information associated with learning data. Thus, each learning data is assigned with a corresponding cluster category. Therefore, each learning data is classified into a corresponding cluster category, as well as its original category. That is, each learning data is associated with category information indicating the original category and cluster category information indicating a cluster category.

Note that the storage unit 10 and the cluster category storage unit 22 may not be provided in the document classification device 1 but may be provided outside the document classification device 1.

Operation Example 1

Figure 2:
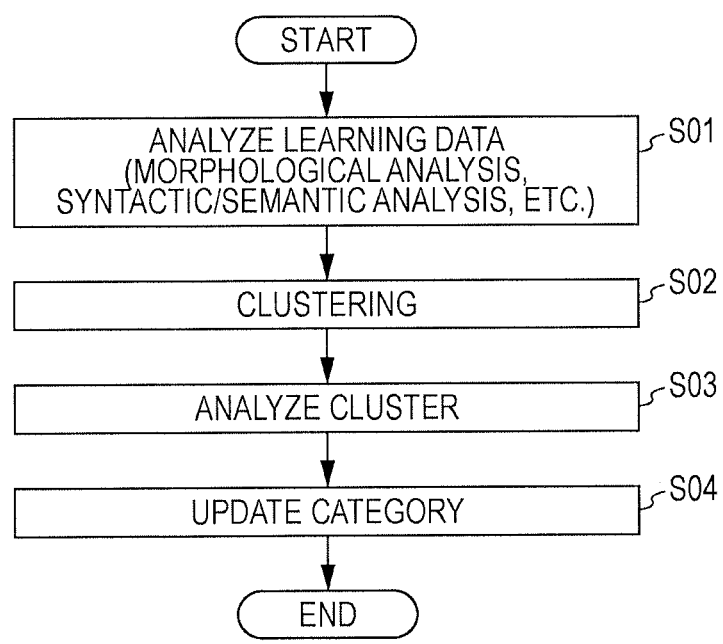
FIG. 2 is a flowchart illustrating operation example 1.

Next, with reference to a flowchart illustrated in FIG. 2, operation example 1 of the document classification device 1 will be described. First, the characteristic extraction unit 16 reads plural learning data from the data storage part 12, extracts characteristic information from each of the plural learning data by analyzing the learning data, and vectorizes the learning data (S01). Next, the clustering unit 18 classifies the plural vector-represented learning data into clusters (S02). Then, the cluster analysis unit 20 analyzes configurations of categories within a cluster, based on category information associated with learning data which belongs to the cluster (S03). The category update unit 24 defines each category which belongs to the same cluster and the appearance ratio of the category as a cluster category, and by associating each learning data which belongs to the same cluster with cluster category information of the cluster, updates the category of the learning data (S04).

Operation Example 2

Figure 3:
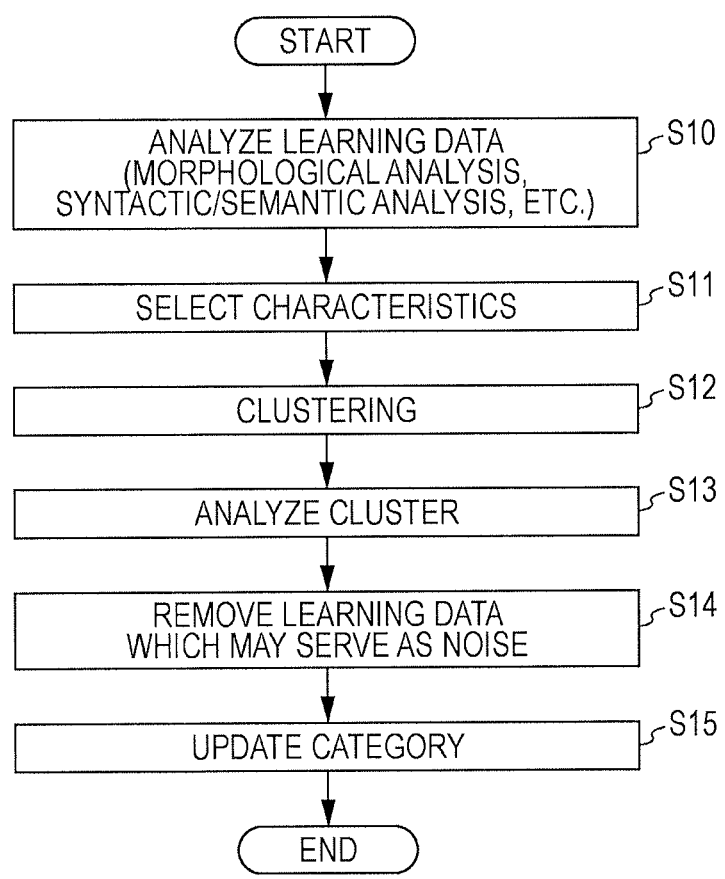
FIG. 3 is a flowchart illustrating operation example 2.

Next, with reference to a flowchart illustrated in FIG. 3, operation example 2 of the document classification device 1 will be described. First, the characteristic extraction unit 16 extracts characteristic information from each of plural learning data by analyzing the learning data (S10). Next, the characteristic extraction unit 16 removes characteristic information which may serve as a noise among the plural pieces of extracted characteristic information, selects characteristic information which may not serve as a noise, and vectorizes each learning data (S11). For example, the characteristic extraction unit 16 treats synonyms among the extracted plural pieces of characteristic information as an identical feature, or removes an unnecessary feature on the basis of a Tf-idf value, and vectorizes each learning data. Then, the clustering unit 18 classifies the plural vector-represented learning data into clusters (S12), and the cluster analysis unit 20 analyzes a configuration of categories within a cluster (S13). Furthermore, the cluster analysis unit 20 removes learning data of a cluster which may serve as a noise (S14). The cluster analysis unit 20 may remove a category whose number is less than the number of a different category and for which the difference between the numbers is equal to or larger than a threshold. Then, the category update unit 24 updates the category of each learning data by associating cluster category information with the learning data which belongs to the same cluster.

Specific Example

An operation of the document classification device 1 will now be described by way of a specific example. FIG. 4 illustrates an example of learning data which is classified into specific categories in advance. For example, learning data assigned with learning data identification information (ID=1, 2) are classified in advance into a category called "Summary", learning data of ID=3 is classified in advance into a category called "History", and learning data of ID=4 is classified in advance into a category called "Configuration". Each learning data is stored in the storage unit 10, and category information which indicates a corresponding category of the learning data is stored in the category storage part 14.

The characteristic extraction unit 16 extracts characteristic information from each learning data (ID=1, 2, 3, and . . . ), and vectorizes the learning data. FIG. 5 illustrates an example of vector representation of learning data of ID=1. For a simpler explanation, a content word (term) is used as a feature of a vector, and the number of times of appearance is used as a score. A WID in FIG. 5 represents identification information provided for each term by the characteristic extraction unit 16. The WID represents the index number of a vector, and the number of times of appearance represents the score in the index number. The characteristic extraction unit 16 may assign the same WID to synonyms by utilizing a dictionary or the like. Furthermore, a threshold may be set for a score (the number of times of appearance or the appearance frequency), and a feature with a score which is less than or equal to the threshold may be removed. That is, the characteristic information which is used in the cluster classification by the clustering unit 18 may be selected in accordance with the score.

The clustering unit 18 classifies vector-represented learning data into clusters in accordance with a predetermined method. FIG. 6 illustrates clustering results. A CID in FIG. 6 represents cluster identification information for identifying each cluster. In the example illustrated in FIG. 6, learning data of ID=1, 3, 10, and . . . are classified into a cluster of CID=1. The learning data of ID=1 is classified into the "Summary" category in advance, and the learning data of ID=3 is classified into the "History" category in advance. Therefore, the "Summary" category and the "History" category belong to the cluster of CID=1. Furthermore, the learning data of ID=2 is classified into a cluster of CID=2. The learning data of ID=2 is classified into the "Summary" category in advance. Therefore, the "Summary" category belongs to the cluster of CID=2. Similarly, for clusters of other CIDs, categories of learning data which have been classified into the clusters belong to the corresponding clusters. Hereinafter, for convenience of explanation, the cluster of CID=1 will be referred to as a "cluster 1", the cluster of CID=2 will be referred to as a "cluster 2". The same applies to clusters of other CIDs.

The cluster analysis unit 20 obtains the number of times of appearance of category of each learning data (ID=1, 3, 10, and . . . ) which belongs to the cluster 1 within the cluster 1, and the appearance ratio of the category within the cluster 1. Similarly, for other clusters 2, 3, and . . . , the number of times of appearance and the appearance ratio of the category are obtained. The number of times of appearance of a category within a cluster represents the number of learning data which are classified into the category in advance and which are classified into the cluster by the clustering unit 18. The cluster analysis unit 20 may remove a cluster or learning data which may serve as a noise. FIG. 7 illustrates analysis results of clusters. In the example illustrated in FIG. 7, 516 learning data (categories) are classified into the cluster 1 (the number of elements=516). Specifically, the cluster 1 includes 120 pieces of the "History" category and 101 pieces of the "Summary" category. This represents that the 120 learning data which are classified into the "History" category in advance are classified into the cluster 1 by the clustering unit 18, and the 101 learning data which are classified into the "Summary" category in advance are classified into the cluster 1 by the clustering unit 18. Furthermore, in the cluster 1, the appearance ratio of the "History" category is 0.23 (23%), and the appearance ratio of the "Summary" category is 0.20 (20%). That is, 23% of all of the categories that are classified into the cluster 1 is the "History" category, and 20% of the categories is the "Summary" category.

One learning data (category) is classified into the cluster 2 (the number of elements=1). Specifically, one piece of the "Summary" category is classified into the cluster 2. This represents that one learning data which is classified into the "Summary" category in advance is classified into the cluster 2 by the clustering unit 18. Therefore, the appearance ratio of the "Summary" category in the cluster 2 is 1.00 (100%).

333 learning data (categories) are classified into a cluster 3 (the number of elements is 333). Specifically, the cluster 3 includes 91 pieces of the "Configuration" category and 52 pieces of the "Summary" category. This represents that the 91 learning data which are classified into the "Configuration" category in advance are classified into the cluster 3 by the clustering unit 18 and the 52 learning data which are classified into the "Summary" category in advance are classified into the cluster 3 by the clustering unit 18. Furthermore, in the cluster 3, the appearance ratio of the "Configuration" category is 0.27 (27%), and the appearance ratio of the "Summary" category is 0.16 (16%).

The category update unit 24 newly defines each category (History, Summary, and . . . ) which belongs to the cluster 1 and the appearance ratio (0.23, 0.20, and . . . ) of the category as a cluster category of CID=1. Similarly, the category update unit 24 newly defines the "Summary" category which belongs to the cluster 2 and the appearance ratio (1.00) as a cluster category of CID=2, and newly defines each of the categories (Configuration, Summary, and . . . ) which belongs to the cluster 3 and the appearance ratio (0.27, 0.16, and . . . ) of the category as a cluster category of CID=3. The same applies to other clusters.

The category update unit 24 assigns cluster identification information (CID=1) of the cluster 1 to the learning data belonging to the cluster 1 and associates the learning data belonging to the cluster 1 with cluster category information which indicates the cluster category of CID=1. Similarly, the category update unit 24 associates learning data belonging to other clusters with corresponding cluster category information. Hereinafter, for convenience of description, the cluster category of CID=1 will be referred to as a "cluster category 1", and the cluster category of CID=2 will be referred to as a "cluster category 2". The same applies to cluster categories of other CIDs.

FIG. 8 illustrates an example of learning data assigned with cluster categories. The learning data of ID=1, 3 belong to the cluster 1. Therefore, the learning data of ID=1, 3 are associated with the cluster category information which indicates the cluster category 1. That is, the cluster category information which includes the "History" category, the appearance ratio of the "History" category, the "Summary" category, and the appearance ratio of the "Summary" category is associated with the learning data of ID=1, 3. Furthermore, the learning data of ID=2 belongs to the cluster 2. Therefore, the learning data of ID=2 is associated with the cluster category information which indicates the cluster category 2. That is, the cluster category information which indicates the "Summary" category and the appearance ratio of the "Summary" category is associated with the learning data of ID=2.

An example of the learning data of ID=1 will be explained. The cluster category which is assigned to the learning data of ID=1 may be interpreted, for example, as follows:

(1) The learning data of ID=1 is data which is classified into the "History" category with 23% probability and classified into the "Summary" category with 20% probability;

(2) The learning data of ID=1 is data which includes 23% characteristics of the "History" category and 20% characteristics of the "Summary" category; and (3) The learning data of ID=1 is data which includes characteristics of the "History" category and characteristics of the "Summary" category.

The learning data of ID=1 is classified into the "Summary" category in advance. However, the appearance ratio of the "History" category (23%) is larger than the appearance ratio of the "Summary" category (20%). Therefore, it is analyzed that the characteristics of the "History" category are stronger than the characteristics of the "Summary" category. Other cluster categories may be interpreted in a similar manner.

As described above, by classifying learning data into a cluster based on characteristic information of the learning data which is classified into a specific category in advance, and by newly defining a category which belongs to the cluster and the appearance ratio of the category as a cluster category and associating the learning data with the cluster category, even when the boundary between categories is ambiguous and there is an ambiguity in definition of a category, a cluster category which expresses the ambiguity is assigned to the learning data. Terms have various meanings and concepts. Therefore, categories may not be independent from one another. Therefore, a category assigned to learning data in advance may not accurately represent the characteristics of the learning data. According to this exemplary embodiment, a cluster category which expresses an ambiguity of a category is assigned to learning data. Therefore, a category which more accurately represents the characteristics of the learning data is assigned to the learning data.

For example, as with the learning data of ID=1 described above, there is a possibility that the "History" element is stronger than the "Summary", even when the "Summary" category was originally assigned to the learning data. In this case, instead of assigning only one of the "Summary" category and the "History" category to the learning data of ID=1, by assigning both the categories including the appearance ratios thereof to the learning data of ID=1 as a cluster category, the characteristics of the learning data of ID=1 are expressed more accurately than the case where no cluster category is assigned to the learning data. For example, in the case where only the "Summary" category is assigned to the learning data of ID=1, although the learning data of ID=1 has the characteristics of the "History" category, those characteristics are not represented. In contrast, the cluster category assigned to the learning data represents that the learning data of ID=1 has the characteristics of the "Summary" category and the "History" category. Thus, the characteristics of the learning data of ID=1 are expressed more accurately.

As described above, by performing classification processing for learning data which is classified into a specific category in advance, and by classifying the learning data into a new cluster category, the accuracy of document classification using learning data may be improved.

In addition, by a display device which is not illustrated, the correspondence between a category, a cluster category, and learning data may also be displayed. For example, the correspondence may be displayed in the table format illustrated in FIG. 8. Accordingly, information for a user to understand concepts and meanings of learning data and information for the user to re-assign categories are provided to the user.

Modified Example

Figure 9:
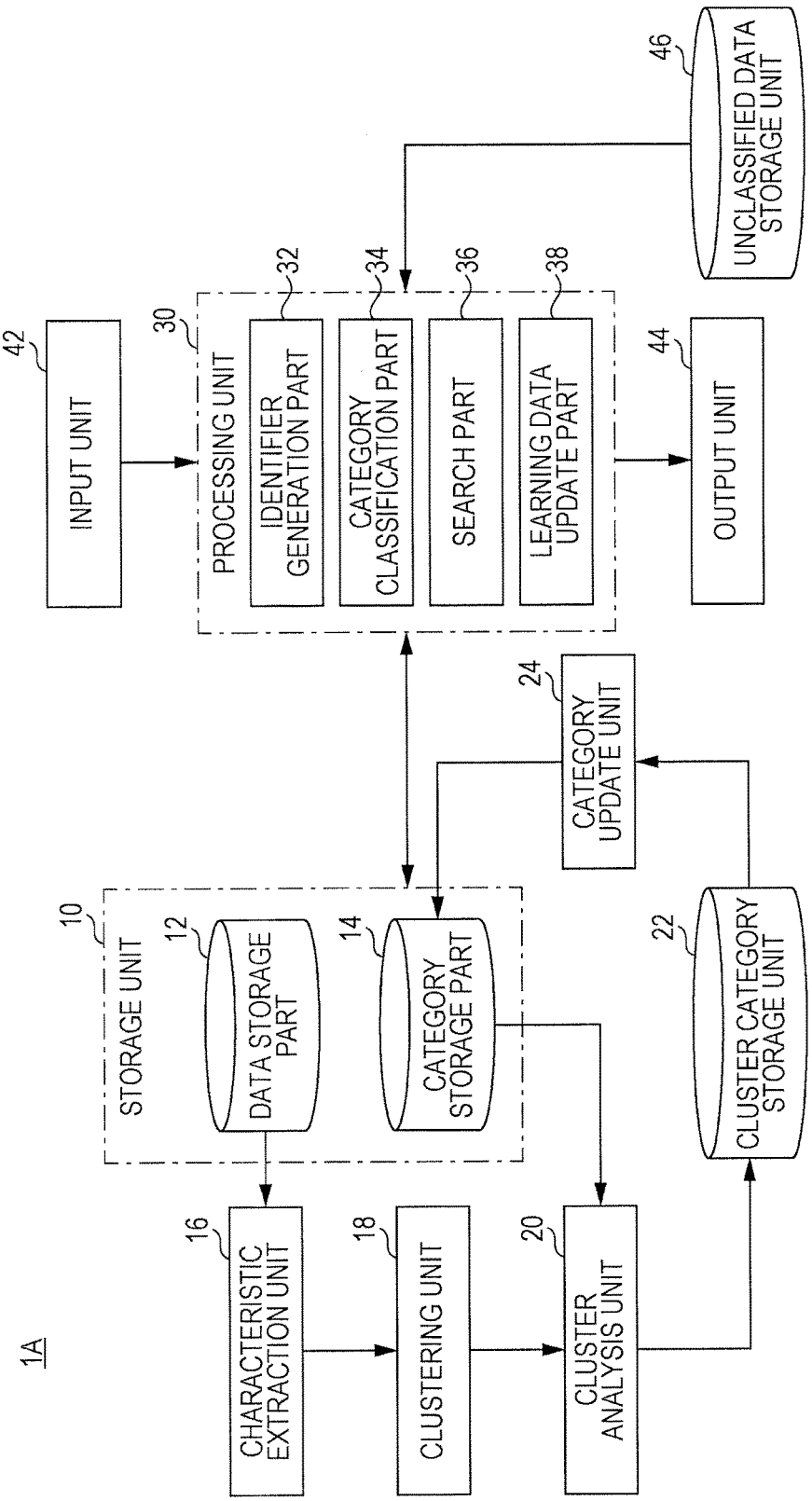
FIG. 9 is a block diagram illustrating an example of a document classification device according to a modified example.

Next, with reference to FIG. 9, a document classification device according to a modified example will be described. A document classification device 1A according to the modified example includes, in addition to the configuration of the document classification device 1 described above, a processing unit 30, an input unit 42, and an output unit 44. The processing unit 30 includes an identifier generation part 32, a category classification part 34, a search part 36, and a learning data update part 38. An unclassified data storage unit 46 stores document data (referred to as "unclassified data") which is not classified into specific categories.

The input unit 42 is, for example, a user interface, and receives input of information by a user. The output unit 44 is, for example, a display device, a network interface, a printer, or the like, and outputs a processing result of the processing unit 30.

The identifier generation part 32 generates an identifier ("category identifier") from learning data which is classified into a specific category. For example, a principal component vector of learning data is used as an identifier. Furthermore, the identifier generation part 32 may generate an identifier ("cluster category identifier") from learning data which is classified into a cluster category.

The category classification part 34 uses the identifier to obtain a category of unclassified data, and classifies the unclassified data into the category. Furthermore, the category classification part 34 may use the identifier to obtain a cluster category of unclassified data and classify the unclassified data into the cluster category.

The search part 36 sets learning data assigned with a cluster category as a search target, and searches for data using a search query received by the input unit 42. The search part 36 calculates scores from the degree of correspondence between the learning data and the search query, and outputs search results in descending order of score (results in which data with higher scores have upper levels). Furthermore, when a term of a category is included in a search query, the search part 36 also sets a cluster category as a search target, and adjusts a score representing the degree of correspondence between the search query and the search target data, in accordance with the configuration of the categories belonging to the cluster category. For example, the score is adjusted by providing weight to the score in accordance with the appearance ratio of the category that matches the term included in the search query. Thus, the larger the appearance ratio of a category that matches a term included in a search query, the score of the learning data which is classified into the corresponding category becomes higher.

The learning data update part 38 updates various data when categories or cluster categories are assigned to unclassified data. For example, the learning data update part 38 stores unclassified data which is assigned with a category or cluster category as learning data into the data storage part 12. Furthermore, the learning data update part 38 may update data stored in the category storage part 14 and the cluster category storage unit 22. Moreover, the learning data update part 38 may update a category of learning data on the basis of the search result of the search part 36.

Operation Example 3

Figure 10:
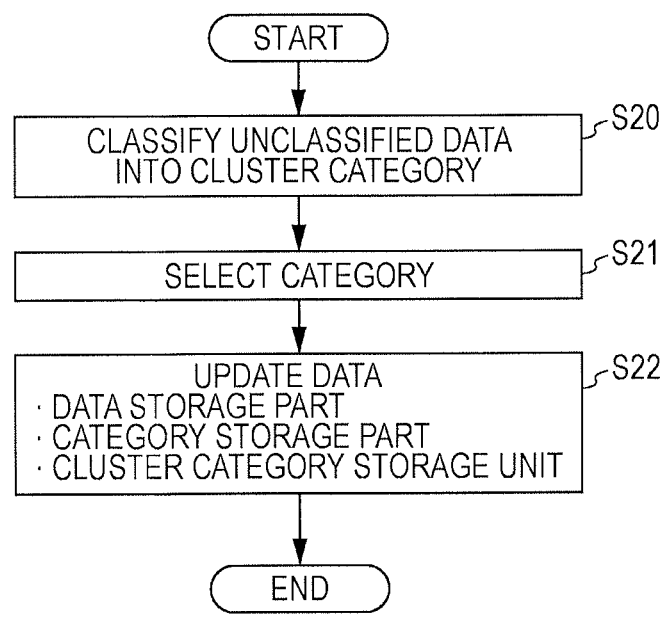
FIG. 10 is a flowchart illustrating operation example 3.

Next, with reference to FIG. 10, an operation example (operation example 3) of the document classification device 1A according to the modified example will be described. In the operation example 3, learning data is updated by assigning a category or cluster category to unclassified data.

First, the category classification part 34 obtains a cluster category of unclassified data by using a cluster category identifier generated by the identifier generation part 32, and classifies the unclassified data into a cluster category (S20). Then, the category classification part 34 selects a category among categories which belong to the cluster category (S21). For example, the category classification part 34 may assign a category with the largest appearance ratio, among the categories which belong to the cluster category, to the unclassified data. The category with the largest appearance ratio may represent the characteristics of the unclassified data more accurately. Therefore, by assigning the category with the largest appearance ratio to the unclassified data, a category which represents the characteristics of the unclassified data more accurately is assigned to the unclassified data. Alternatively, the output unit 44 may display a list of categories which belong to a cluster category, and a user may select a category by using the input unit 42. In this case, the category classification part 34 assigns the category selected by the user to unclassified data. In addition, only the cluster category may be assigned to the unclassified data.

The learning data update part 38 then updates various data (S22). For example, the learning data update part 38 stores the unclassified data assigned with a category or cluster category as learning data in the data storage part 12. Furthermore, the learning data update part 38 increments the number of times of appearance of the selected category by one, and updates the number of elements of the cluster and the appearance ratio of the category. Accordingly, data stored in the category storage part 14 and the cluster category storage unit 22 is updated. Describing with reference to FIG. 7, when the "History" category which belongs to the cluster category 1 (CID=1) is selected in step S21, the learning data update part 38 increments the number of times of appearance of the "History" category in the cluster category 1 by one, increments the number of elements of the cluster category 1 by one, and updates the appearance ratio of the "History" category in the cluster category 1. In addition, when a category is assigned to unclassified data, the identifier generation part 32 may update the identifier.

As described above, by updating learning data by assigning a category or cluster category to unclassified data, information which serves as a basis for generating a cluster category is updated. Therefore, the accuracy of the classification of a cluster category is improved.

Furthermore, as another example, the operation example 3 may be applied to the case where document data to which a category, the heading of a paragraph, or the like is not assigned is desired to be assigned with a category or a heading. For example, the category classification part 34 classifies target data into a cluster category by using the identifier, and assigns the target data with the cluster category, the category with the largest appearance ratio among categories which belong to the cluster category, or a category selected by the user among the categories which belong to the cluster category. Also in this case, the learning data update part 38 updates various data.

In the case where the document classification device 1A operates based on the operation example 3, the processing unit 30 may not include the search part 36.

Operation Example 4

Figure 11:
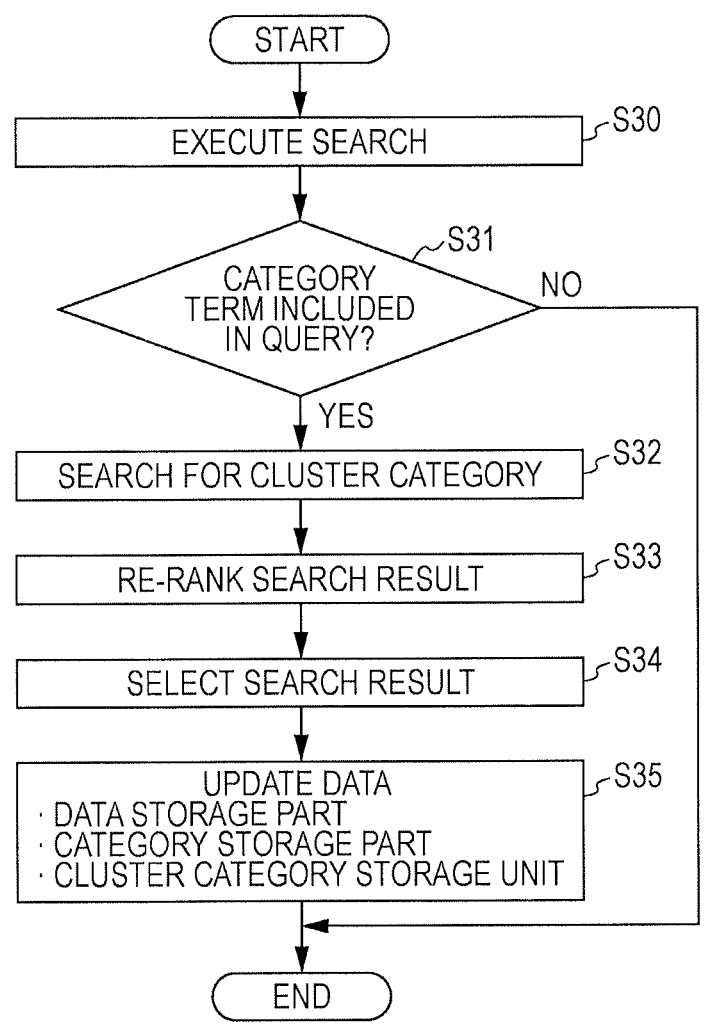
FIG. 11 is a flowchart illustrating operation example 4.

Next, with reference to FIG. 11, another operation example (operation example 4) of the document classification device 1A according to the modified example will be described. In the operation example 4, search is performed for learning data which is assigned with a cluster category as a search target, and the learning data is updated on the basis of the search result.

First, when a search query is input via the input unit 42, the search part 36 sets learning data which is assigned with a cluster category as a search target, and calculates a score in accordance with the degree of correspondence between the learning data as the search target and the search query (S30).

In the case where the search query includes no category term (for example, "Summary", "History", or the like) (S31, No), the search part 36 outputs a search result obtained in step S30, and ends the search processing. For example, the output unit 44 displays the search results in descending order of score.

In contrast, when the search query includes a category term (S31, Yes), the search part 36 also performs searching for a cluster category as a search target (S32). Describing with reference to FIG. 8, for example, when the search query includes the category term "History", the search part 36 performs searching for a cluster category as a search target, identifies a cluster category which includes the term "History" as the search query, and extracts learning data assigned with the cluster category. In the example illustrated in FIG. 8, the learning data of ID=1, 3 which are assigned with the cluster category 1 are extracted. Even when text of the learning data of ID=1, 3 does not include the term "History", since the cluster category 1 which is assigned to the learning data of ID=1, 3 includes the "History" category, the learning data of ID=1, 3 are extracted by the searching.

As the appearance ratio of a category that matches the term of a search query increases, the search part 36 raises the score of learning data which is classified into the category, and re-ranks the search result obtained in step S30 (S33). For example, the output unit 44 displays the search result which has been re-ranked.

The user refers to the search result which has been re-ranked, and selects arbitrary learning data using the input unit 42 (S34).

When the learning data is selected by the user, the learning data update part 38 updates various data (S35). This update processing will be described with reference to FIG.

8. For example, when a search query includes the category term "History" and the user selects the learning data of ID=1 which is classified into the "Summary" category among search results, the learning data update part 38 changes the category of the learning data of ID=1 from the "Summary" category into the "History" category. By changing the category in this manner, the category of the learning data of ID=1 is corrected, and the category which represents the characteristics of the learning data of ID=1 more accurately is assigned to the learning data of ID=1. Furthermore, similar to the operation example 3, the learning data update part 38 updates the number of elements of the cluster and the number of times of appearance and the appearance ratio of the category, in accordance with the selection of the category.

As described above, by setting a cluster category as a search target, it is possible to extract learning data which will not be extracted when no search query exists in text of the learning data and only the learning data is used as a search target. Accordingly, the learning data which may be related to the search query is extracted. For example, in the case where no search query is included in text of learning data and a search query indicates the concept and meaning of the learning data, if only the learning data is used as a search target, the learning data which matches the concept and the meaning of the search query is not extracted. However, by using a cluster category as a search target, the learning data which matches the concept and the meaning of the search query is extracted. Therefore, unlike the case in which merely text of learning data is used as a search target, the learning data including the concept and the meaning may be searched for.

The above-mentioned document classification devices 1 and 1A are, for example, implemented by cooperation of hardware resources and software. Specifically, the document classification devices 1 and 1A include a processor, such as a central processing unit (CPU), which is not illustrated. The processor executes the function of each of the characteristic extraction unit 16, the clustering unit 18, the cluster analysis unit 20, the category update unit 24, and the processing unit 30 described above, by reading and executing a program stored in a storage device which is not illustrated. The above program is stored in a storage device, such as a hard disk drive (HDD), via a recording medium, such as a compact disc (CD) or a digital versatile disc (DVD), or via a communication unit, such as a network. Furthermore, the above program may be stored in advance in the storage device, such as a hard disk drive. The function of each of the units described above may be implemented when the program stored in the storage device, such as a hard disk drive, is read into a memory, such as a random access memory (RAM), and executed by the processor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document classification device comprising:
   at least one hardware processor configured to implement:
   a characteristic extraction unit that extracts, from a plurality of learning data, first characteristic information from each of a first document data and a second document data, and excludes a second characteristic information of the learning data in response to determining that the second characteristic information is at least one of a synonym to the first characteristic information and having a term frequency-inverse document frequency (Tf-idf) value greater than a predetermined value;
   a clustering unit that clusters the first document data and the second document data into a same cluster by determining that the first document data and the second document data each comprise both an appearance frequency and an appearance ratio within predetermined thresholds associated with the first characteristic information; and
   a category update unit that, after the first document data and the second document data are clustered into the same cluster assigns a second category, from the second document data, to the first document data such that the first document data is assigned both a first category and also the second category within the same cluster;
   wherein the, learning data comprises the first document data assigned to the first category before the first character information is extracted by the characteristic extraction unit,
   wherein the learning data comprises the second document data assigned to the second category before the second characteristic information is extracted by the characteristic extraction unit,
   wherein the first characteristic information indicates one or more terms contained in the plurality of learning data,
   wherein the appearance frequency indicates numbers of times one or more terms appear in ones of the first document data and the second document data,
   wherein the appearance ratio indicates ratios between the one or more terms in the ones of the first document data and the second document data to other terms in the ones of the first document data and the second document data.

2. The document classification device according to claim 1,
   wherein the characteristic extraction unit extracts, as the first characteristic information, information, related to at least one of the first category and the second category, from each of the first document data and the second document data.

3. The document classification device according to claim 1,
   wherein the category update unit assigns an appearance ratio of at least one of the first category and the second category both to the first document data and also to the second document data, of which the first document data and the second document data are both in the same cluster.

4. The document classification device according to claim 1, wherein the at least one hardware processor is further configured to implement:
   a search unit that:
   receives a search query and, in response to determining that the search query includes information which is related to at least one of the first category and the second category, searches, using the at least one of the first category and the second category, for both the first category, which is assigned in advance to the first document data, and the second category, which is assigned by the category update unit as a search target, and outputs a search result.

5. The document classification device according to claim 4,
wherein the search unit further outputs the search result, which corresponds to a second appearance ratio of both of the first category, assigned to the first document data, and the second category, assigned to the second document data, with respect to both of the first document data and the second document data in the same cluster.

6. The document classification device according to claim 4, wherein the at least one hardware processor is further configured to implement:
an update unit that changes a searched category, of the first document data and the second document data, into the at least one of the first category and the second category, in response to determining that the at least one of the first category and the second category searched using the search query and information related to the at least one of the first category and the second category included in the search query do not match.

7. The document classification device according to claim 1, wherein the at least one hardware processor is further configured to implement:
a category classification unit that assigns at least one of the first category and the second category to unclassified third document data by using an identifier which is generated based on the first document data to which the second category is assigned by the category update unit.

8. The document classification device according to claim 7,
wherein the category classification unit further assigns the second category to the unclassified third document data by determining that the same cluster comprises a larger appearance ratio of the second category than the first category.

9. The document classification device according to claim 7, wherein the at least one hardware processor is further configured to implement:
a unit that adds the unclassified third document data, assigned the second category in advance by the category classification unit, to at least one of the first document data and the second document data.

10. The document classification device according to claim 1, wherein the category update unit further:
selects the second category to be assigned to the first document data by determining at least one of a first appearance ratio, of the first category assigned to the first document data in advance of the first document data being clustered into the same cluster as the second document data, and a second appearance ratio, of the second category assigned to the second document data in advance of the second document data being clustered into the same cluster as the first document data.

11. The document classification device according to claim 1, wherein the first document data, to which the first category is assigned in advance of being clustered into the same cluster, comprises a plurality of first text,
the second document data, to which the second category is assigned in advance of being clustered into the same cluster, comprises a plurality of second text, wherein the plurality of first text and the plurality of second text are clustered into the same cluster and are each assigned both of the first category and the second category after being clustered into the same cluster.

12. The document classification device according to claim 11, wherein the same cluster is identified by a first category identifier and a second category identifier,
wherein, in the same cluster identified by the first category identifier, the plurality of the first text and the plurality of the second text are each assigned at least the first category, and
wherein, in the same cluster identified by the second category identifier, the plurality of the first text and the plurality of the second text are each assigned at least the second category.

13. The document classification device according to claim 1, wherein the category update unit further assigns the second category to the first document data by determining that more second characteristics of the second category, assigned in advance to second learning data, are present in the same cluster, which includes both of the first document data and the second document data, than first characteristics of the first category, assigned in advance to first learning data.

14. The document classification device according to claim 1,
wherein, before the clustering unit clusters the first document data and the second document data into the same cluster but after the first document data is assigned the first category and the second document data is assigned the second category, the characteristic extraction unit extracts the first characteristic information, from each of the first document data and the second document data.

15. The document classification device according to claim 1,
wherein the clustering unit further clusters one of the first document data and the second document data into a second cluster such that the second cluster comprises a third document data of the learning data and the one of the first document data and the second document data,
wherein the clustering unit further deletes the second cluster in response to determining both that a first number of data of the second cluster is smaller than a second number of data of a plurality of other clusters, including the same cluster, and that a difference between the first number and the second number is equal to or greater than a second predetermined threshold.

16. A document classification method comprising:
Extracting from a plurality of learning data, first characteristic information from each of a first document and a second document data, and excluding a second characteristic information of the learning data in response to determining that the second characteristic information is at least one of a synonym to the first characteristic information and data having a term frequency-inverse document frequency (Tf-idf) value greater than a predetermined value;
clustering the first document data and the second document data, into a same cluster by determining that the first document data and the second document data each comprise both an appearance frequency and an appearance ratio within predetermined thresholds associated with the first characteristic information; and
after the first document data and the second document data are clustered into the same cluster, assigning a second category, from the second document data, to the first document data such that the first document data is assigned both a first category and also the second category within the same cluster, wherein the learning data comprises the first document data assigned to the first category before the first characteristic information is extracted, wherein the learning data comprises the second data assigned to the second category before the second characteristic information is extracted, wherein the first characteristic information indicates one or more terms contained in the plurality of learning data, wherein the appearance frequency indicates numbers of times one or more terms appear in ones of the first document data and the second document data, wherein the appearance ratio indicates ratios between the one or more terms in the ones of the first document data and the second document data to other terms in the ones of the first document data and the second document data.

17. A non-transitory computer readable medium storing a program causing a computer to execute a process for document classification, the process comprising:

extracting, from a plurality of learning data, first characteristic information from each of a first document data and a second document data, and excluding a second characteristic information of the learning data in response to determining that the second characteristic information is at least one of a synonym to the first characteristic information and data having a term frequency-inverse document frequency (Tf-idf) value greater than a predetermined value;

clustering the first document data and the second document data into a same cluster by determining that the first document data and the second document data each comprise both an appearance frequency and an appearance ratio within predetermined thresholds associated with the first characteristic information; and after the first document data and the second document data are clustered into the same cluster, assigning a second category, from the second document data, to the first document data such that the first document data is assigned both a first category and also the second category within the same cluster, wherein the learning data comprises the first document data assigned to the first category before the first characteristic information is extracted, wherein the learning data comprises the second document data, assigned to the second category before the second characteristic information is extracted, wherein the, first characteristic information indicates one or more terms contained in the plurality of learning data, wherein the appearance frequency indicates numbers of times one or more terms appear in ones of the first document data and the second document data, wherein the appearance ratio indicates ratios between the one or more terms in the ones of the first document data and the second document data to other terms in the ones of the first document data and the second document data.

\* \* \* \* \*